Oct. 2, 1934.  J. FLETCHER ET AL  1,975,097
METHOD OF OPERATING A VAPOR GENERATOR
Filed Nov. 10, 1931  3 Sheets-Sheet 1
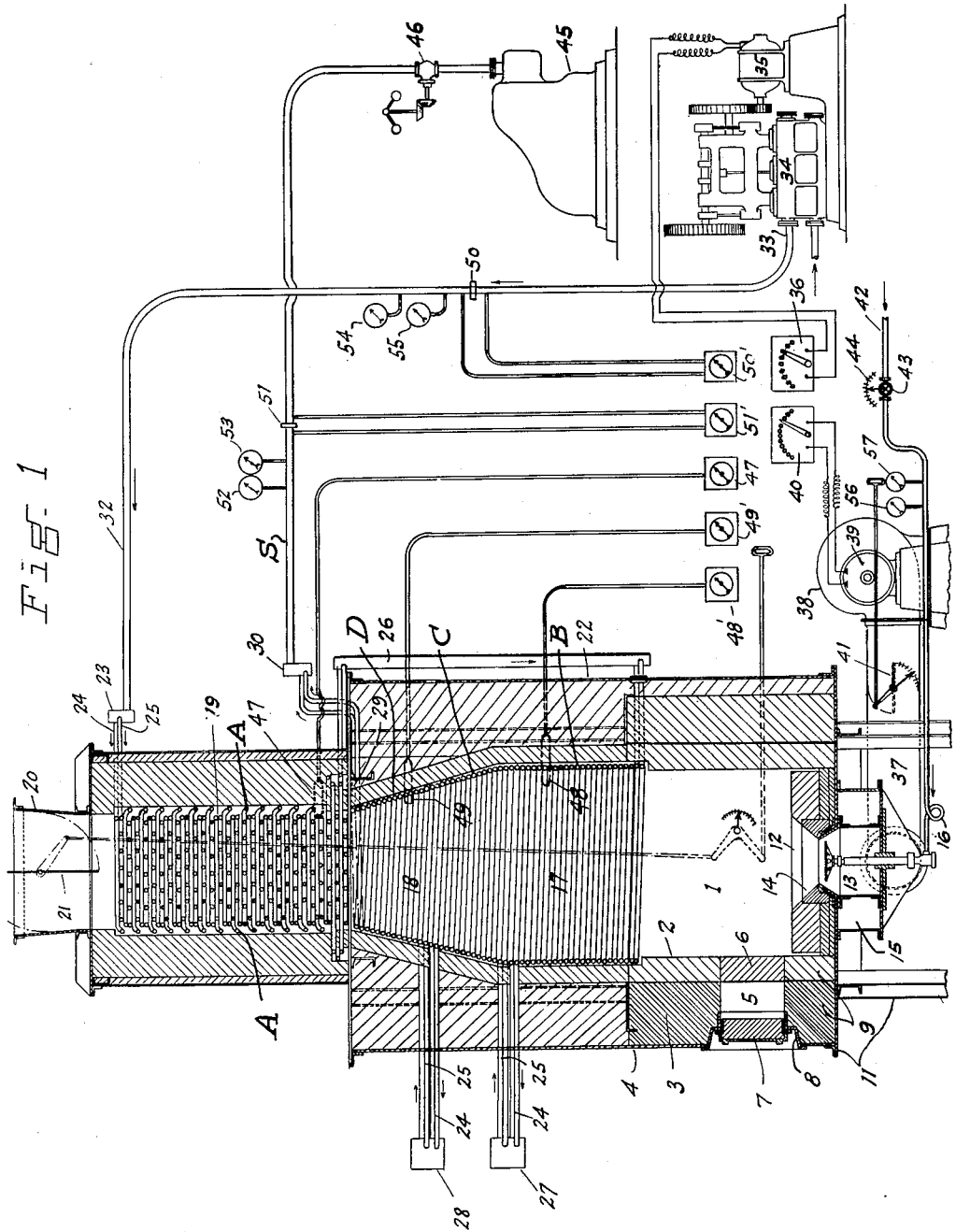
INVENTORS
*James Fletcher*
*Paul S. Dickey*
BY
ATTORNEY

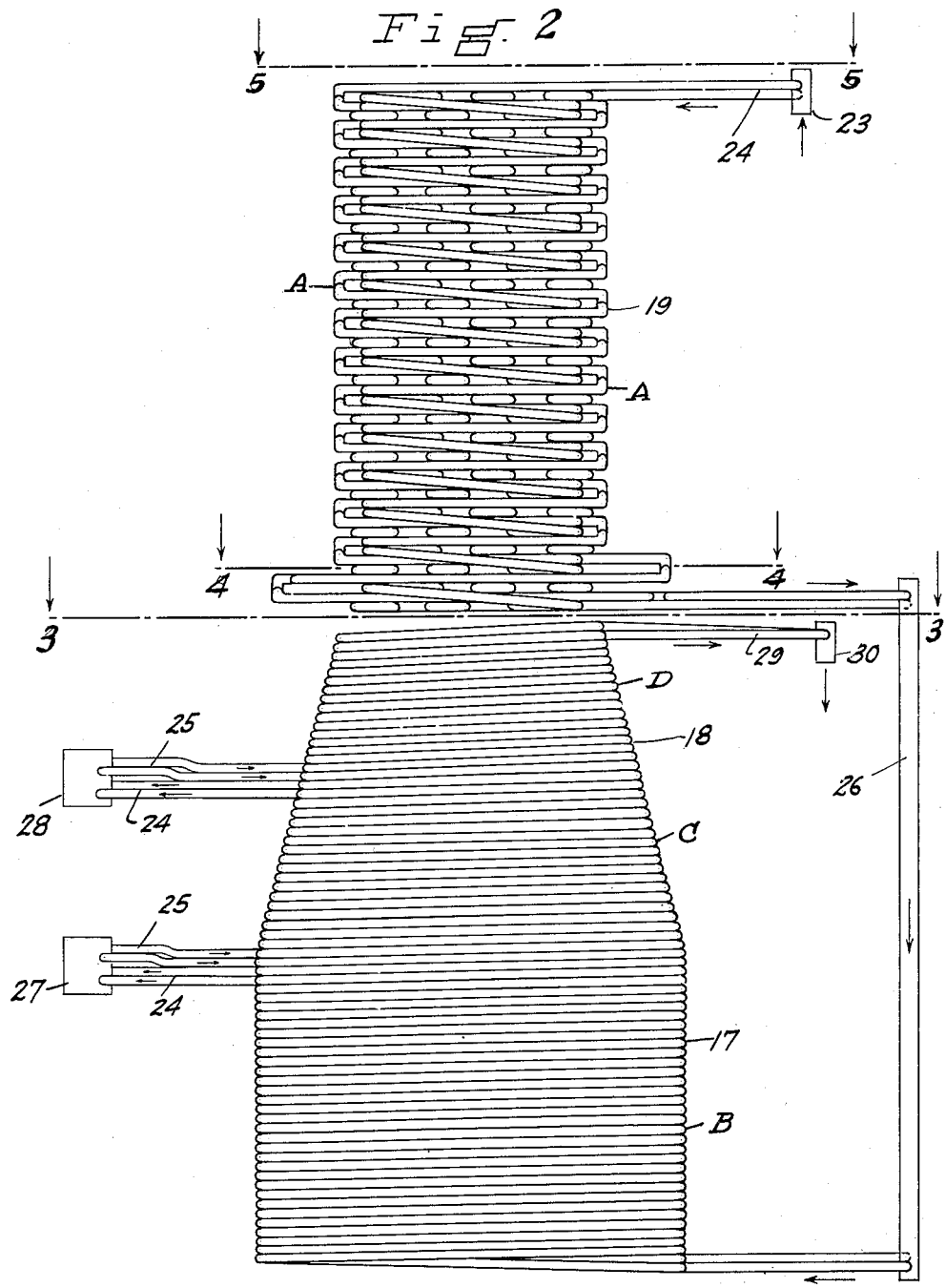

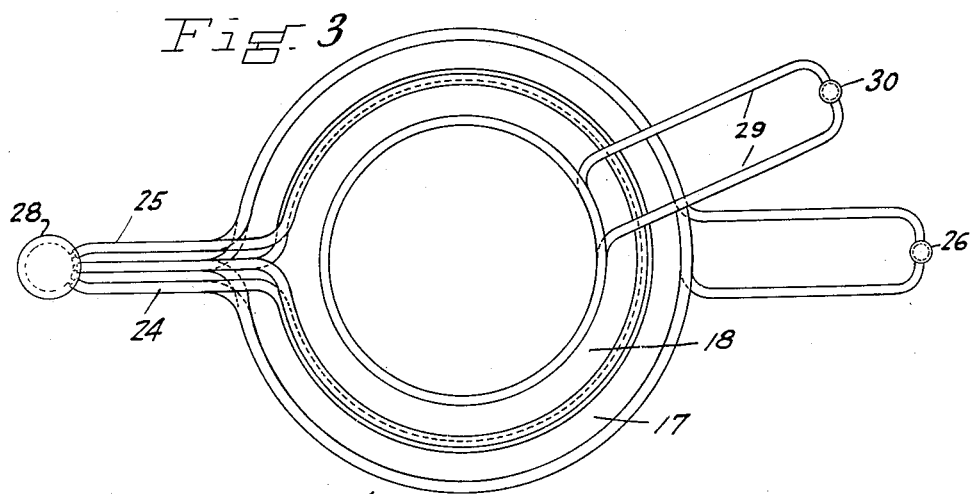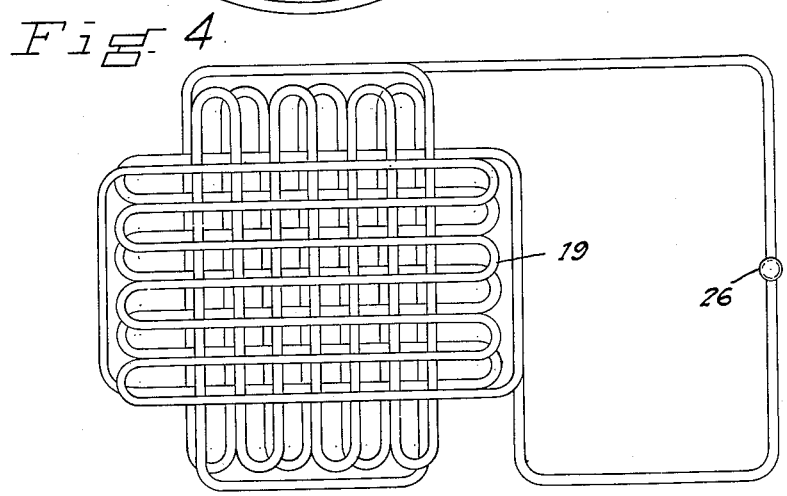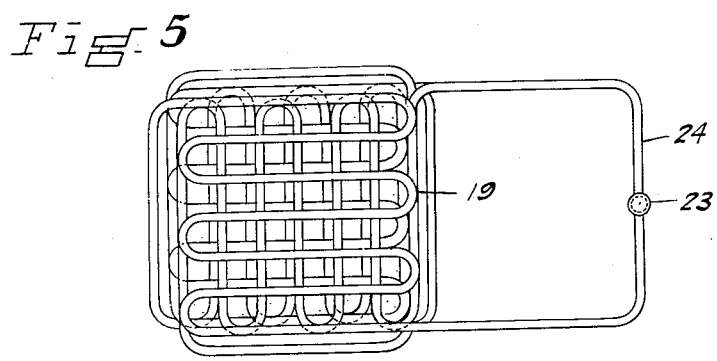

Patented Oct. 2, 1934

1,975,097

UNITED STATES PATENT OFFICE

1,975,097

METHOD OF OPERATING A VAPOR GENERATOR

James Fletcher, West New Brighton, Staten Island, N. Y., and Paul S. Dickey, Cleveland, Ohio, assignors to The Babcock & Wilcox Company, Bayonne, N. J., a corporation of New Jersey Application November 10, 1931, Serial No. 574,076

7 Claims. (Cl. 122—446)

This invention relates to a vapor generator and to a method for controlling the operation thereof, and more particularly stated the invention presents an improvement over the inventions disclosed in co-pending applications entitled "Method of and apparatus for operating a steam boiler", Serial No. 357,419, filed in the United States Patent Office April 23, 1929 by James Fletcher, and the application of Howard J. Kerr entitled "Steam boiler", Serial No. 450,348, filed in the United States Patent Office May 7, 1930, and both of which applications relate to drumless boilers having fluid flow paths in which the flow in each path is initiated by the entrance of water at one end of the path and characterized by the exit of steam only of known quality and quantity at the other end of each path.

Broadly stated, the present invention has for its object the method of operating a once through vapor generator by regulating the vaporizing fluid and the elements of combustion from the interrelation of the measures of their quantities and/or their condition.

A particular object is to regulate the generator by controlling the liquid flow thereto in accordance with an indication of load or generator output with a readjustment of liquid flow in accordance with an indication of the temperature, or some other measure of at least one of the physical characteristics, of the fluid flowing through the generator conduit at some location in the fluid flow path.

In boilers of the character above mentioned, wherein the liquid volume is always at a minimum, a method and means for operating the same in accordance with varying conditions must be provided, such a method and means in addition to the foregoing, may provide for balancing of vapor outflow against liquid inflow, with readjustment in accordance with other variables such, for instance, as fluid temperature at a location just beyond the saturation line, control of elements of combustion by either pressure or temperature of the fluid, or both, and such other combination of means for varying variables that output of the generator may be regulated in accordance with the demand.

In addition, this present invention contemplates a vapor generator providing an arrangement of heating surfaces and fluid paths best adapted for the method of operation herein disclosed.

In the drawings:—

Figure 1 is a side elevation, in section, of a steam generator according to the present invention and combined with the requisite equipment to regulate the functioning thereof;

Fig. 2 is a side elevation of the elements comprising the steam generator per se;

Fig. 3 is a sectional view on the line 3—3 of Fig. 2;

Fig. 4 is a sectional view on the line 4—4 of Fig. 2;

Fig. 5 is a top plan view on the plane 5—5 of Fig. 2.

The vapor generator comprises a furnace 1 having walls 2 suitably insulated as shown at 3 and including a jacket 4 to maintain the insulation in place. Through the walls 2 there is an opening 5 closed by refractory material 6 and a door 7 mounted in the frame 8. The bottom portion 9, and its closure 10, are carried in a suitable structural or welded steel frame-work 11. A central opening 12 receives any usual type of fuel burner 13 for either solid or liquid fuel, but the burner in this instance is illustrated as a mechanical type atomizer for liquid fuel and discharges through the burner tile 14; the air box 15 of this burner may have a suitable control, such as hereinafter set forth, as is also the case with the fuel line 16, so that the fuel and air, hereinafter referred to as elements of combustion, may be measured and regulated.

The furnace portion of the generator is surmounted by a secondary combustion chamber 17 having a contracted portion 18 ending in a flue 19 leading to the stack 20, which stack is controlled by a damper 21 provided with adjusting and indicating means, the whole being supported by means of structural steel frame-work of any suitable form. A jacket 22 covers the secondary combustion chamber 17 and its contracted portion outside the refractory wall 2 and its attendant insulation.

Fluid to be converted into vapor under pressure is fed to a header 23, from which originate two parallel conduits 24 and 25 each of series type and which are of small diameter and great length, being formed sinuously in layers by suitable bending as shown in connection with Figs. 1 and 3 to 5 inclusive, the portions located in the flue 19 having much greater length than the remaining portions, and which extend down to the juncture of the flue 19 with the contracted portion 18 of the secondary combustion chamber 17, where the two conduits 24 and 25 emerge and enter an equalizing header 26, from the bottom of which they again emerge and are coiled in parallel relation from the top of the main furnace section 1 up to an intermediate plane just below the constricted portion 18 of the secondary combustion chamber 17, where the two conduits 24 and 25 then emerge into an equalizing or mixing header 27 which brings the discharge from the two conduits into mixing relation to commingle and equalize the fluid from each and equalize the temperature, again, separating into the two conduits 24 and 25 which are then coiled upwardly through the constricted portion 18 of the secondary combustion chamber 17 until they again emerge and enter an equalizing header 28, in which the vapor from the two is commingled for equalization of temperature and distribution, the conduits then being again divided and coiled within the secondary combustion chamber 17 to the top of the restricted portion 18 thereof and emerging, as indicated at 29, to an outlet header 30, where the discharge from the two conduits is again commingled for fluid and temperature equalization.

It will be observed that by these equalizing headers the grouping of the conduits is definitely segregated into four sections, namely, an economizer section A with its initial entrance at 23, a water wall section B with its initial entrance at 21, a steam generating section C with its initial entrance from the header 27, and a superheating section D with its initial entrance from the equalizing header 28, the final outlet of superheated vapor being from 30.

From the foregoing it will also be observed that the equalizing headers 26, 27, 28 and 30 are each located at a position where there is no change in physical state of the fluid passing thereto so that better mixing is insured than could be accomplished were attempts made to mix fluids of different physical characteristics as, for instance, steam and water or saturated and superheated steam.

It will likewise be apparent that the grouping of the respective portions of the conduits is such that each represents a continuous sinuous fluid path of great length and small diameter from liquid entrance to superheated vapor outlet, with some portion thereof having fluid flow countercurrent to the hot gases passing thereover while other portions thereof have fluid flow with the gases passing thereover concurrently.

The grouping of the conduit areas and their arrangement with respect to the furnace, secondary combustion chamber 17, and flue 19, is such that in so far as arrangement is considered, the heat absorbed by any one conduit is substantially equal to the heat absorbed by any other conduit, with the result that heat input to each conduit for a given combustion condition is approximately constant, and the furnace and flue are constructed so that the heat stored therein is at a minimum.

Also, the arrangement of conduits 24 and 25 is such, as shown in Figs. 2 to 5 inclusive, that the length of conduits approximately equal each other, the resistance to flow in the conduits being equivalent mechanically.

In the form of the invention shown, the conduits 24 and 25 are coiled from the furnace chamber 1, upon the wall of which they are supported, up through the contracted portion 18 of the secondary combustion chamber 17, from which they are then arranged in sinuous form crossing and recrossing at right angles, and some of the bends being extended to engage the wall for support.

The entrance header 23 is connected by a liquid supply pipe 32 to the discharge 33 of a positive displacement pump 34 connected with a motor 35, the speed of which is controlled by a rheostat 36 electrically connected with said motor and having indicating means indicating the pump delivery.

The air box 15 of the mechanical burner 13 is connected by a flue 37 with a blower 38 furnishing air for combustion and which is driven by a motor 39 controlled through the medium of a rheostat 40 the position of which may indicate air delivered; a damper 41 is mounted in the pipe 37 so that the amount of air delivered for combustion is measured and controlled by changing the speed of the fan 38 or adjustment of said damper 41.

The liquid fuel line 42 delivering fuel to the burner 13 through the pipe 16 is provided with a manually regulated valve 43 having an indicator 44 to indicate the amount of fuel delivered to the burner 13; it will thus be evident that the elements of combustion, such as air and fuel, may each be measured and adjusted.

The superheated steam outlet line S may be connected to a turbine 45, or other prime mover controlled by a governor 46 in the said steam line S.

To enable the operator to regulate the quality and quantity of steam, the fluid input, and elements of combustion, must be governed in accordance with each other and in accordance with conditions within the fluid conduits and the load, accordingly, there is located throughout the system, at advantageous points, indicating means now to be described which will keep the operator advised so that proper operating relation may be maintained at all times.

In the economizer, near the outlet, as shown at 47, near the inlet of the generating section as shown at 48, and at some point 49 beyond the saturation position, and preferably after some superheat has been added to the steam, are located the temperature registering elements shown and which may be in the fluid path, thermally contacted with the conduits, or in the path of the furnace gases, these elements having indicating means 47', 48' and 49' respectively. In addition a metering device 50 with indicator 50' is located in the fluid supply line and a metering device 51 with an indicator 51' is located in the steam outlet 9.

From the indications enumerated above conditions of operation may be controlled to govern the quality and quantity of steam to meet the demand, by the methods hereinafter claimed.

Temperature and pressure indicating means are provided also on the steam outlet as indicated at 52 and 53; on the fluid inlet 32 as indicated at 54 and 55; and also upon the fuel inlet 16 as shown at 56 and 57. Similar pressure and temperature indicators may be provided on the air intake and flue gas exit if desirable.

In the drawings there is illustrated one form which the invention may take in practice, and the same is shown including indicating and measuring means rendering possible the operation of the invention by the method described. It is, however, understood that any coordinating means may be utilized in connection with the respective measuring and adjusting members to facilitate the operation thereof.

We claim:

1. The method of controlling quality and quantity of vapor from a generator having a once through fluid passage receiving liquid at one end and delivering superheated vapor at the other, which includes supplying liquid to the passage throughout a preponderance of its length ending at a zone representing complete conversion from liquid to vapor state under normal generator conditions, maintaining a constant weight of liquid inflow equivalent to the weight of vapor outflow, and varying the liquid inflow when the ratio between liquid occupied passage length and vapor occupied passage length departs from normal by adjusting the proportion of the passage length occupied by liquid in a direction to restore normalcy.

2. The method of controlling quality of vapor from a generator having a once through fluid passage receiving liquid at one end and delivering superheated vapor at the other, which includes supplying liquid to the passage to occupy a preponderance of its length, regulating the elements of combustion to normally supply heat for maintaining superheated vapor generation with a preponderance of the conduit length occupied by liquid, sustaining the liquid supply equal in weight to the vapor generated, and varying the proportion of the passage length occupied by liquid to restore normalcy when the ratio between liquid occupied passage length and vapor occupied passage length departs from normal.

3. A method of operating a vapor generator having a once-through fluid passage receiving liquid at one end and heated by elements of combustion to deliver superheated vapor at the other end, which comprises evaluating the liquid supply to the vapor output for a normally balanced weight rate ratio, establishing along the flow path a normal zone approximately representative of change in phase from liquid to complete vapor state, readjusting the weight rate ratio of liquid to vapor in consonance with departure from said zone, and regulating the elements of combustion to increase or decrease the heat release, respectively, with a decrease and increase in pressure and temperature.

4. A method of operating a vapor generator having a once-through fluid passage receiving liquid at one end and heated by elements of combustion to deliver superheated vapor at the other end, which comprises evaluating the liquid supply to the vapor output for a normally balanced weight rate ratio establishing along the flow path a normal zone approximately representative of change in phase from liquid to complete vapor state, readjusting the weight rate ratio of liquid to vapor in consonance with departure from said zone, and regulating the elements of combustion to increase or decrease the heat release, respectively, with a decrease and increase in pressure.

5. The method of controlling the operation of a vapor generator having a once-through fluid passage receiving liquid at one end and delivering superheated vapor at the other and heated by the combustion of fuel and air supplied to the generator, which includes the steps of simultaneously obtaining an indication of the output of the generator, an indication of temperature at a location in the passage just beyond the saturation line, an indication of condition of the superheated vapor leaving the generator, a measure of the supply of fuel, and a measure of the supply of air; obtaining the ratio of such measures, comparing the ratio with a predetermined ratio, controlling the liquid inflow from the indication of output and the indication of temperature, controlling the supply of fuel from the indication of output and the indication of condition, and controlling the supply of air from the comparison of ratios.

6. The method of controlling the operation of a vapor generator having a once-through fluid passage receiving liquid at one end and delivering superheated vapor at the other and heated by elements of combustion, which includes the steps of simultaneously obtaining an indication of the output of the generator, an indication of temperature at a location in the passage just beyond the saturation line, an indication of condition of the superheated vapor leaving the generator, and a measure of the elements of combustion; controlling the inflow of liquid from the indications of output and temperature, controlling the supply of one element of combustion from the indications of output and condition, and controlling the supply of another element of combustion from the measure of the elements of combustion.

7. The method of controlling the operation of a vapor generator having a small liquid storage with a high rate of evaporation and heated by elements of combustion, which includes the steps of simultaneously obtaining an indication of the load on the generator, an indication of condition of the superheated vapor leaving the generator, and a measure of each of the elements of combustion; obtaining the ratio of such measures, comparing the ratio with a predetermined ratio, controlling the supply of one of the elements of combustion from said comparison, controlling the supply of a second element of combustion from the indication of load, and readjusting the supply of the second element of combustion from the indication of condition.

JAMES FLETCHER.
PAUL S. DICKEY.

CERTIFICATE OF CORRECTION.

Patent No. 1,975,097. October 2, 1934.

JAMES FLETCHER, ET AL.

It is hereby certified that error appears in the printed specification of the above numbered patent requiring correction as follows: Page 2, line 125, for "9" read S: and line 129, strike out the comma and words , by the methods hereinaf claimed; and that the said Letters Patent should be read with these corrections therein that the same may conform to the record of the case in the Patent Office.

Signed and sealed this 19th day of March, A. D. 1935.

Leslie Frazer (Seal) Acting Commissioner of Patents.